United States Patent [19]
Kolak

[11] Patent Number: 5,712,644
[45] Date of Patent: Jan. 27, 1998

[54] MICROSTRIP ANTENNA

[76] Inventor: Frank Stan Kolak, 176 Salem Rd., Billerica, Mass. 01821

[21] Appl. No.: 623,749

[22] Filed: Mar. 29, 1996

Related U.S. Application Data

[63] Continuation of Ser. No. 267,586, Jun. 29, 1994, abandoned.

[51] Int. Cl.$^6$ .................................................. H01Q 1/38
[52] U.S. Cl. .................................................. 343/700 MS
[58] Field of Search ............... 343/700 MS; H01Q 1/32, H01Q13/00, 21/08

[56] References Cited

U.S. PATENT DOCUMENTS

| | | | |
|---|---|---|---|
| 4,063,245 | 12/1977 | James et al. | 343/700 MS |
| 4,074,270 | 2/1978 | Kaloi | 343/700 MS |
| 4,079,268 | 3/1978 | Fletcher et al. | 343/700 MS |
| 4,173,019 | 10/1979 | Williams | 343/700 MS |
| 4,203,116 | 5/1980 | Lewin | 343/700 MS |
| 4,686,535 | 8/1987 | Lalezari . | |
| 4,766,440 | 8/1988 | Gegan | 343/700 MS |
| 4,899,163 | 2/1990 | Daniel et al. | 343/700 MS |
| 4,914,445 | 4/1990 | Shoemaker . | |
| 4,918,457 | 4/1990 | Gibson | 343/700 MS |
| 5,017,931 | 5/1991 | Carlyon | 343/700 MS |
| 5,115,245 | 5/1992 | Wen et al. | 342/175 |

FOREIGN PATENT DOCUMENTS

2606271A1  8/1976  Germany .

OTHER PUBLICATIONS

Cruz et al, "Broadside Printed Antenna Arrays Built With Dissymmetrical Subarrays"; Electronics Letters, Feb. 28, 1991, vol. 27, No. 5, pp. 425–426.

James et al, "Microstrip Antennas And Arrays. Pt. 2—New Array–Design Technique"; from Microstrip Antenna Design, Gupta et al., Published by Artech House, 1988, pp. 200–206.

Gupta et al, Microstrip Antenna Design, Published by Artech House, Carver et al, pp. 13–35 no month.

*Primary Examiner*—Michael C. Wimer

[57] ABSTRACT

An microstrip antenna for use in a vehicle collision system is described wherein an array of rectangular patch elements are arranged in rows and columns on a substrate. A feed structure is used whereby a high gain highly efficient flat plate antenna is produced. The feed structure includes a pair of main lines to which feed points are connected. A plurality of branch lines connect at right angles to the main lines and extend alongside columns of patch elements. The patch elements are so spaced that they are electrically separated by a whole multiple of the dielectric wavelength. The main lines are connected to the branch lines by coupling traces whose widths are selected to establish a desired power distribution. A plurality of strip transformers are distributed along the main lines and connected to junctions with the branch lines to reduce reflections.

4 Claims, 6 Drawing Sheets

MICROSTRIP ANTENNA

This application is a Continuation of application Ser. No. 08/267,586 filed Jun. 29, 1994, now abandoned.

FIELD OF THE INVENTION

This invention relates to flat-plate micro strip antennas for vehicle collision avoidance systems generally and more specifically to a feed technique for an array of patch elements used in a flat plate microstrip high gain antenna used in a vehicle collision avoidance radar system.

BACKGROUND OF THE INVENTION

Flat plate linearly polarized planar antenna arrays are used extensively in point-to-point communication systems and in collision avoidance radar guidance systems. In U.S. Pat. No. 4,899,163 to Daniel et al a Janus type antenna is described. The antenna is formed with an array of patch elements that are so spaced on a substrate as to provide a split beam. An even number of square shaped patch elements are aligned and spaced at 180 degree intervals along sub-networks extending at right angles from a central conductor. The resulting antenna beam has two main lobes, which are inclined with respect to a normal to the surface by about ±41 degrees. This type of antenna is not useful in a collision avoidance system where a single narrow antenna beam needs to be directed at the particular road lane on which the vehicle is travelling and where the use of a split beam would result in the recognition of targets that are not in the path of the vehicle.

U.S. Pat. No. 4,866,535 to Lalezari teaches a microstrip antenna wherein the patch elements are connected by a corporate feed structure which winds through an intricate path through the array of patch elements to thereby introduce line losses that reduce the efficiency of the antenna. Special phasing is employed to produce a main antenna beam that is off center.

These antennas are useful for the particular purpose for which they were designed. However, for a vehicle collision avoidance radar system it is desirable to employ a microstrip antenna which is efficient, has a high gain single beam with ultra low sidelobes and can be economically and easily manufactured.

SUMMARY OF THE INVENTION

With a microstrip antenna in accordance with the invention a single narrow beam is produced with ultra low sidelobes and capable of operating at a high efficiency. This is achieved with one microstrip antenna in accordance with the invention by forming an array of planar radiating patch elements on a substrate located on a metal plate. The elements are uniformly distributed in rows and columns. The elements along a column are spaced at regular intervals of a whole multiple of a dielectric wavelength at the operating frequency for the antenna. A feed structure is formed by a central main line from which branch lines extend at junctions at right angles. The main line is provided with microstrip impedance transformers selected to minimize reflections from the junctions and a desired power distribution is obtained from the main feed line by controlling coupling strips connecting the branch lines to the main line at the junctions.

As described herein for one embodiment in accordance with the invention the array of patch elements is fed by two centrally located main lines. Each main line has a feed point driven by a circuit located at the other side of the plate. The feed points are so located as to enhance a desired distribution of microwave power to the branch lines and each main line is coupled to half of the array of patch elements. A plurality of impedance matching transformers are distributed along the main lines and connected to the junctions so as to reduce reflections and coupling strips between the main lines and the branch lines are sized in width so as to establish the desired power distribution. With such microstrip antenna a narrow beam can be obtained of the order of about four degrees with the sidelobes as far down as about 28 db and with an efficiency that can be as high as about 50%.

It is, therefore, an object of the invention to provide a microstrip antenna having a narrow beam with ultra low side lobes and capable of operating at a high efficiency at microwave and millimeter frequencies and particularly suitable for use in a vehicle collision avoidance system.

This and other objects and advantages of the invention can be understood from the following detailed description of a microstrip antenna in accordance with the invention and as shown in the drawings.

DETAILED DESCRIPTION OF THE DRAWINGS

Figure 1:
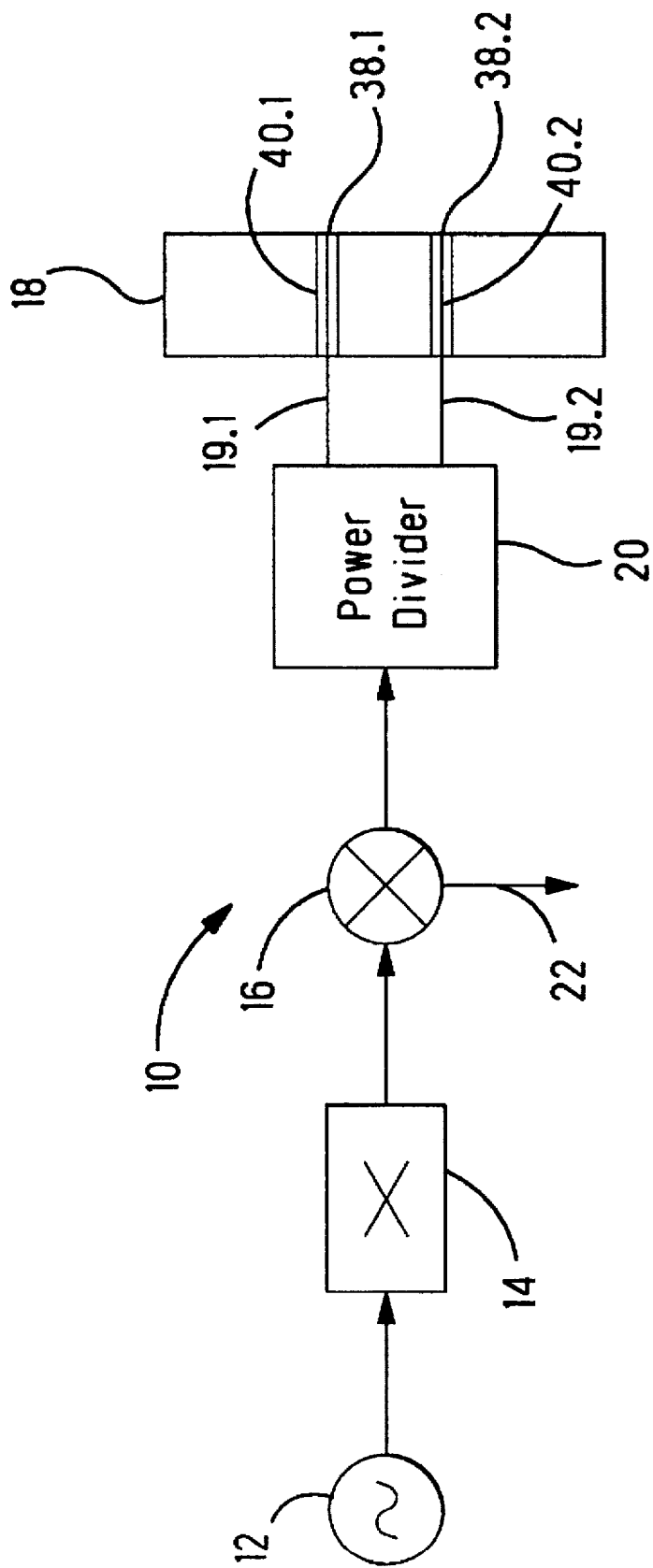
FIG. 1 is a block diagram view of a microstrip antenna in accordance with the invention and connected circuitry.

With reference to FIG. 1 part of a receiver/transmitter circuit 10 is shown formed of an oscillator 12, operating at about 24 Giga Herz and coupled via a waveguide to microstrip transition 14 to a balanced mixer 16. A microstrip antenna 18 in accordance with the invention is connected by lines 19.1 and 19.2 to a power divider 20 to the mixer 16 whose output produces a difference IF signal on output line 22. The difference signal can be a doppler signal indicative of a target within view of the antenna 18. The antenna operates in a CW mode to detect targets from return signals having a different frequency such as due to a doppler effect.

The use herein of characters after decimal points designates specific items, which when referred to without the use of an alpha-numerical character after a decimal point identifies any one or all such items.

Figure 2:
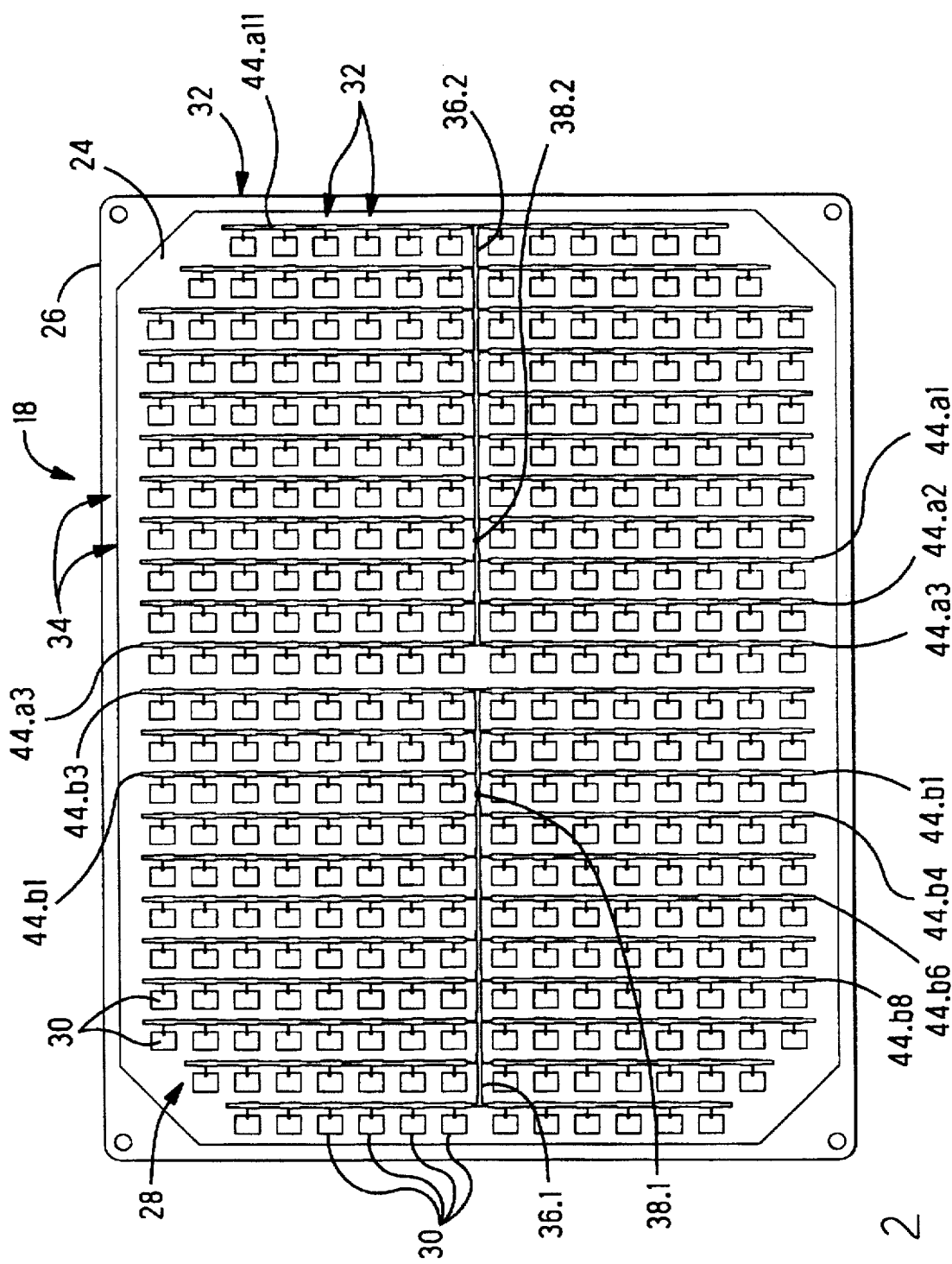
FIG. 2 is a planar view of a microstrip antenna in accordance with the invention.
Figure 3:
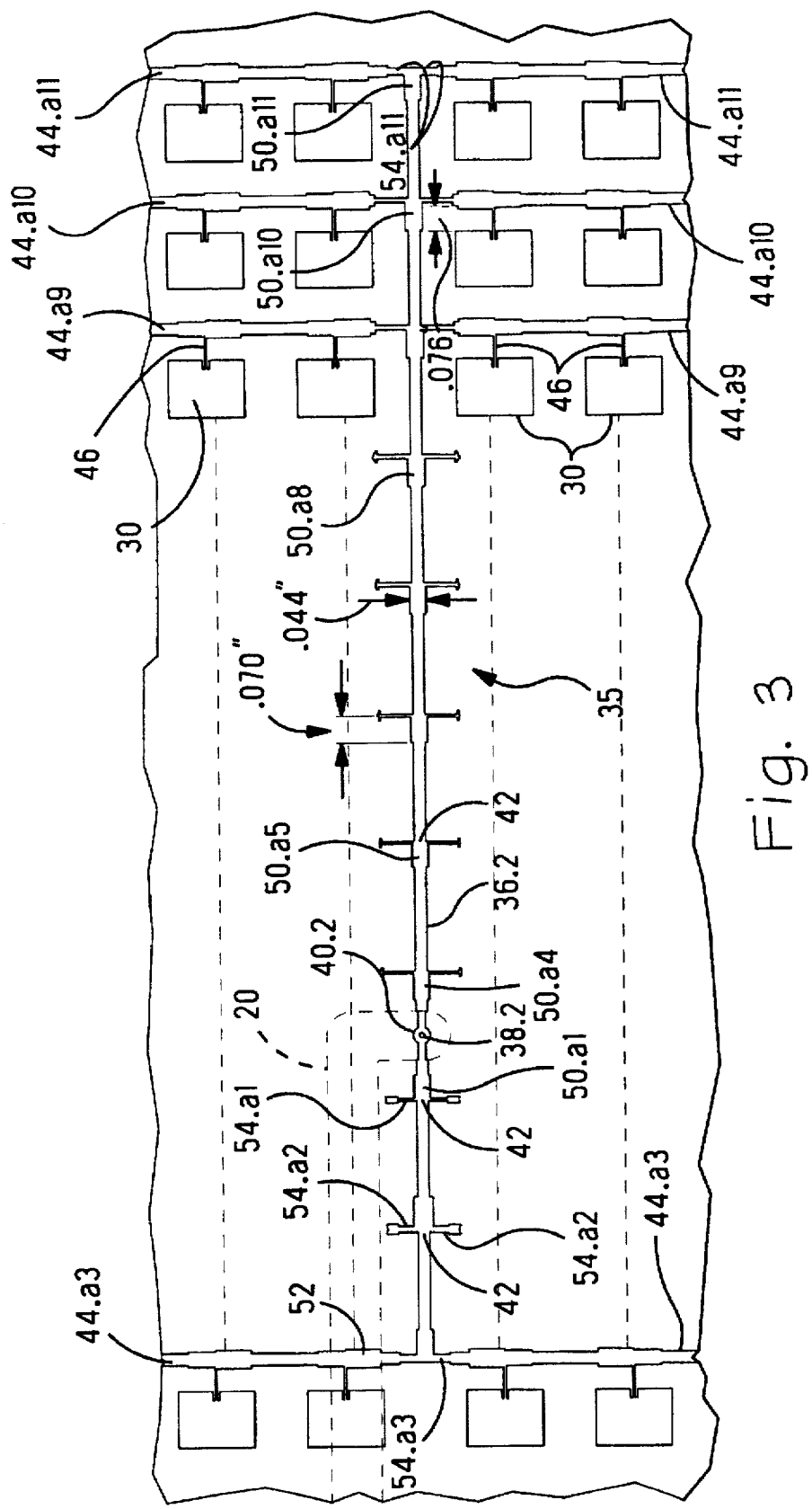
FIG. 3 is an enlarged planar view of a right side central portion of the microstrip antenna shown in FIG. 2.
Figure 4:
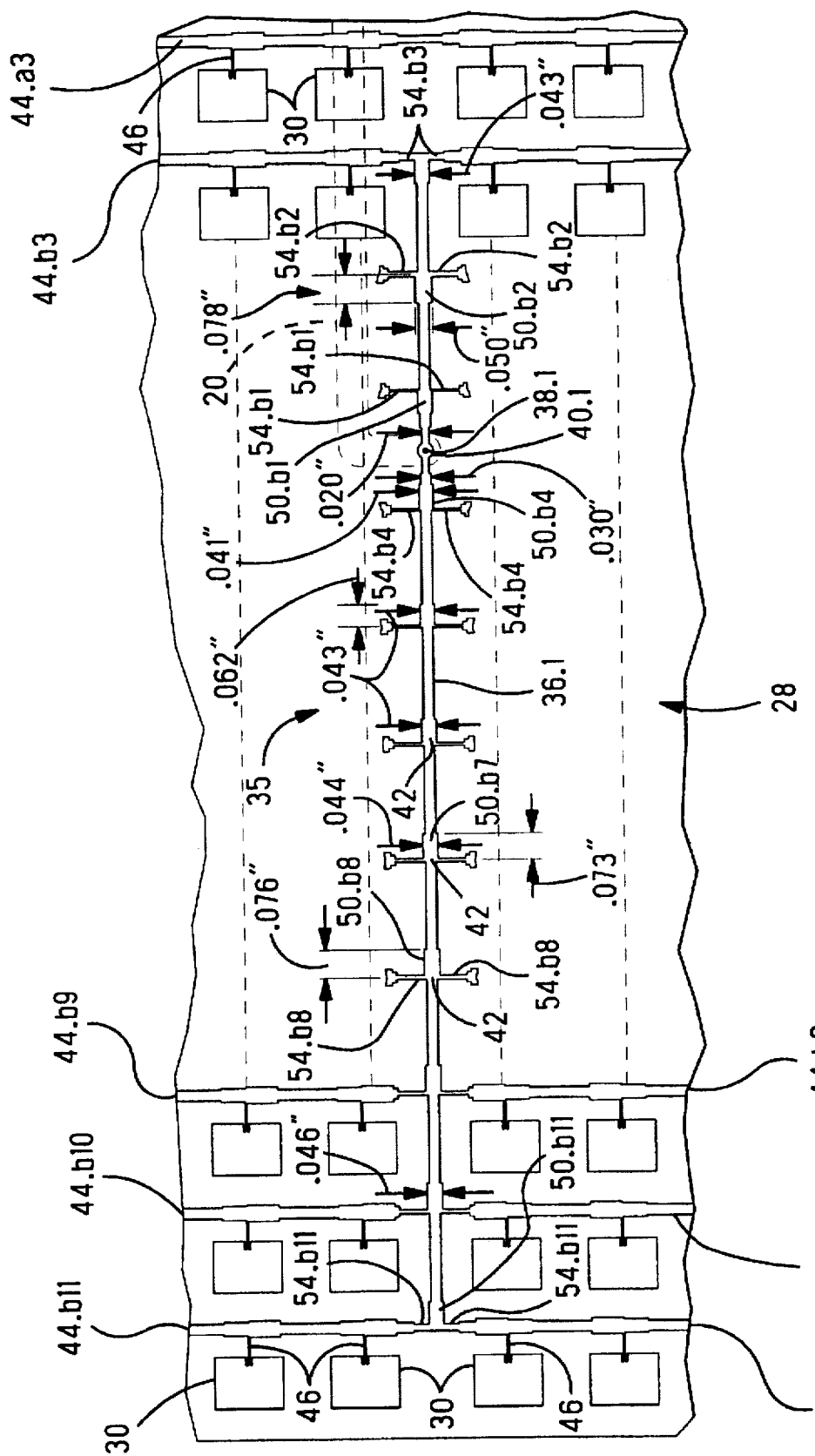
FIG. 4 is an enlarged planar view of a left central portion of the microstrip antenna shown in FIG. 2.

With reference to FIGS. 2, 3 and 4 a microstrip antenna 18 in accordance with the invention is shown. The antenna 18 is formed as a printed circuit on a substrate 24 placed on a metal plate 26, FIG. 2. An array 28 of radiating patch elements 30 is positioned on the substrate with the elements arranged in rows 32 and columns 34. The patch elements have the same length and width selected to be tuned to the same frequency with a substrate thickness of about 1/32 of the dielectric wavelength (λg) W, then the substrate 24. The width W of each element 30 is about ½ λg. A series type feed structure 35, FIGS. 3 and 4, is used for minimum losses and is formed of a pair of centrally located main feed lines 36.1 and 36.2, FIG. 2, extending to opposite sides from a pair of feed points 38.1 and 38.2. The feed points, 38.1 and 38.2 are connected by coaxial lines 40.1, FIG. 4, and 40.2, FIG. 3, extending through the plate 26, to the power divider 20, see FIG. 1.

Extending from junctions 42, FIGS. 3 and 4, at right angles to the main feed lines 36.1 and 36.2 are a plurality of branch lines 44 which are placed alongside columns 34 of patch elements 30. Connecting strips 46 extend between the patch elements 30 to adjacent branch lines 44.a1 ... 44.a11 and 44.b1 ... 44.b11. The spacings between the patch elements 30 along a column 34 are selected so that the elements are electrically separated by a whole multiple of the dielectric wavelength within the substrate 24. The patch elements 30 are thus fed in phase. Hence, any reflection at a patch element's feed point is re-radiated in phase out another element instead of being dissipated or radiated out of phase. Similarly, the electrical lengths between branch lines are selected so as to enable all of the patch elements 30 of the array 28 to be fed in phase.

The main lines 36.1 and 36.2 are provided with microstrip impedance transformers 50.a1 ... 50.a11 and 50.b1 ... 50.b11 that are distributed along the main lines 36 and are connected to each junction 42. The impedance transformers 50.a1 ... 50.a11 and 50.b1 ... 50.b11 are formed by sizing their lengths and widths leading to a junction using 50 ohms as the desired characteristic impedance. The impedance transformers 50.a1 ... 50.a11 and 50.b1 ... 50.b11 are selected so as to reduce impedance mismatches at each junction 42 and thus minimize reflections and maximizing coupling. Similar impedance transformers 52, FIG. 3, are used within the branch lines to reduce reflections and assure uniform power coupling between the radiating elements 30 and the branch lines 44.a1 ... 44.a11 and 44.b1 ... 44.b11 44.

Coupling strips 54.a1 ... 54.a11 and 54.b1 ... 54.b11 extend from each junction 42 to a branch line 44.a1 ... 44.a11 and 44.b1 ... 44.b11 to electrically connect a main line to a branch line. The coupling strips 54.a1 ... 54.a11 and 54.b1 ... 54.b11 are sized in a predetermined manner so as to control the power distribution to the array 28. The majority of the power typically is radiated by the center patch elements. Hence, coupling strips such as 54.a1, a2, and a3, FIG. 3, and 54.b1, b2, and b3, FIG. 4, towards the center of the array 28 from the feed points 38.1 and 38.2 respectively have increasing widths to couple the desired power to the branch lines 44.a1, a2, a3 and 44.b1, b2, b3 at the center. The increased widths compensate for the previous coupling losses.

Figure 6:
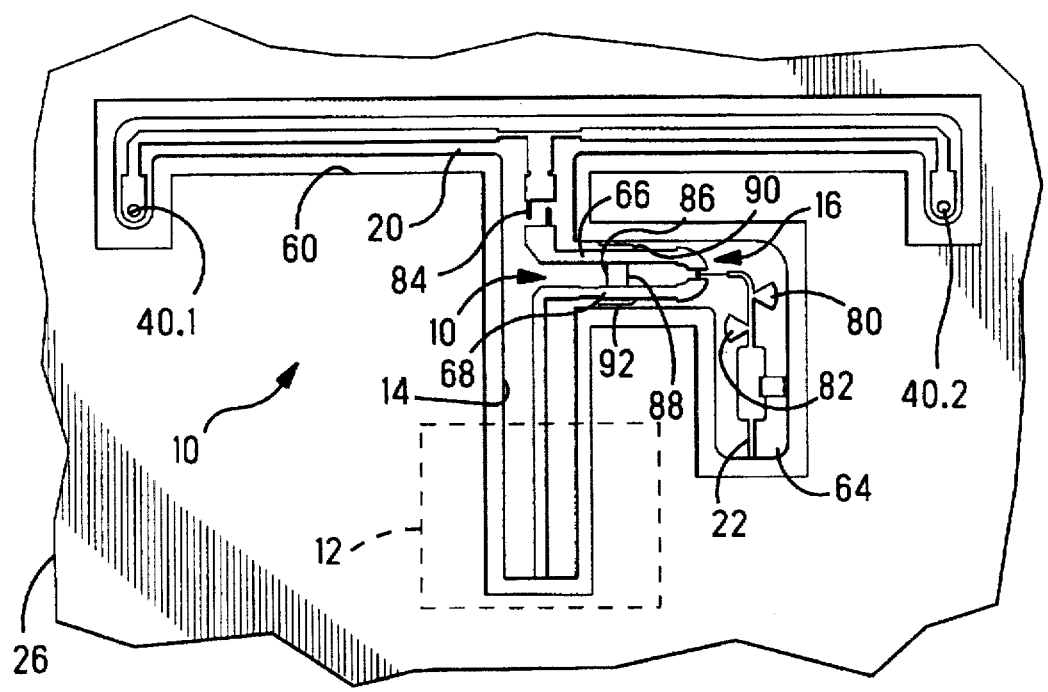
FIG. 6 is an enlarged partial plan view of the back of the antenna of FIG. 2.
Figure 7:
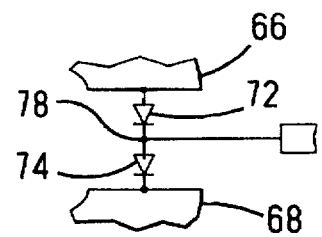
FIG. 7 is an enlarged plan view of the mixer diodes used in the mixing circuit on the back of the antenna of FIG. 2.
Figure 5:
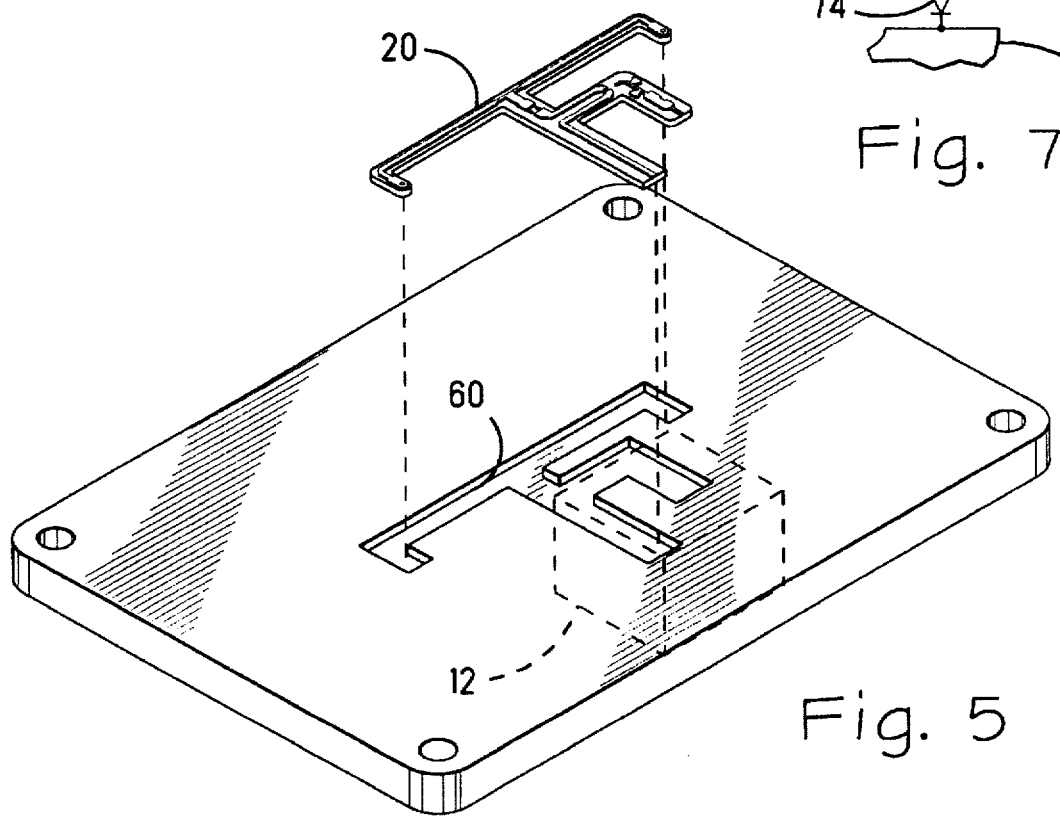
FIG. 5 is a perspective exploded view of a portion of the circuit on the back of the antenna shown in FIG. 2.

Similarly, the outer branch lines 44.a4, to 44.a11 require less power but since the inner branch lines 44.a1 ... 44a3 have decoupled power from the main lines, coupling strips such as 54.a4, a5, a6, a7, a8, a9, a10 and a11 need to be successively wider to receive a proper amount of power. Similar considerations apply to the branch lines coupled to the other main line 36.1, With reference to FIGS. 5, 6 and 7, the network 10, located on the rear side of antenna plate 26 is shown. The plate 26 is provided with a microstrip cavity 60 in the form of a T, with the power divider 20 placed within the cavity 60 as part of a printed circuit 62 on a substrate 64.

Cavity 60 includes microstrip segment 14 coupled to oscillator 12, only shown in dotted outline and connected to mixer 16. Mixer 16 is formed of a pair of main conductor traces 66, 68 that are part of a hybrid circuit 70. A pair of series coupled microwave diodes 72, 74 are connected across the gap 76 between conductor traces 66, 68. The junction 78 between the diodes 72, 74 is the IF output 22 from mixer 16. The IF output is passed through low pass filters 80, 82 to output line 22. The power divider 20 is coupled to the mixer 16 through an AC coupler and high pass filter 84.

The hybrid circuit 70 includes rf coupling conductors 86, 88 sized to enable rf power transfer to power divider 20 while also enabling excitation of diodes 72, 74. The hybrid circuit is designed so that the path lengths enable transmission of rf power with little loss from the oscillator 12 to power divider 20 while enabling received signals from the power divider to be coupled with little loss to mixing diodes 72, 74. DC diode return lines, 90, 92 connect conductor traces 66, 68 to ground.

Figure 8:
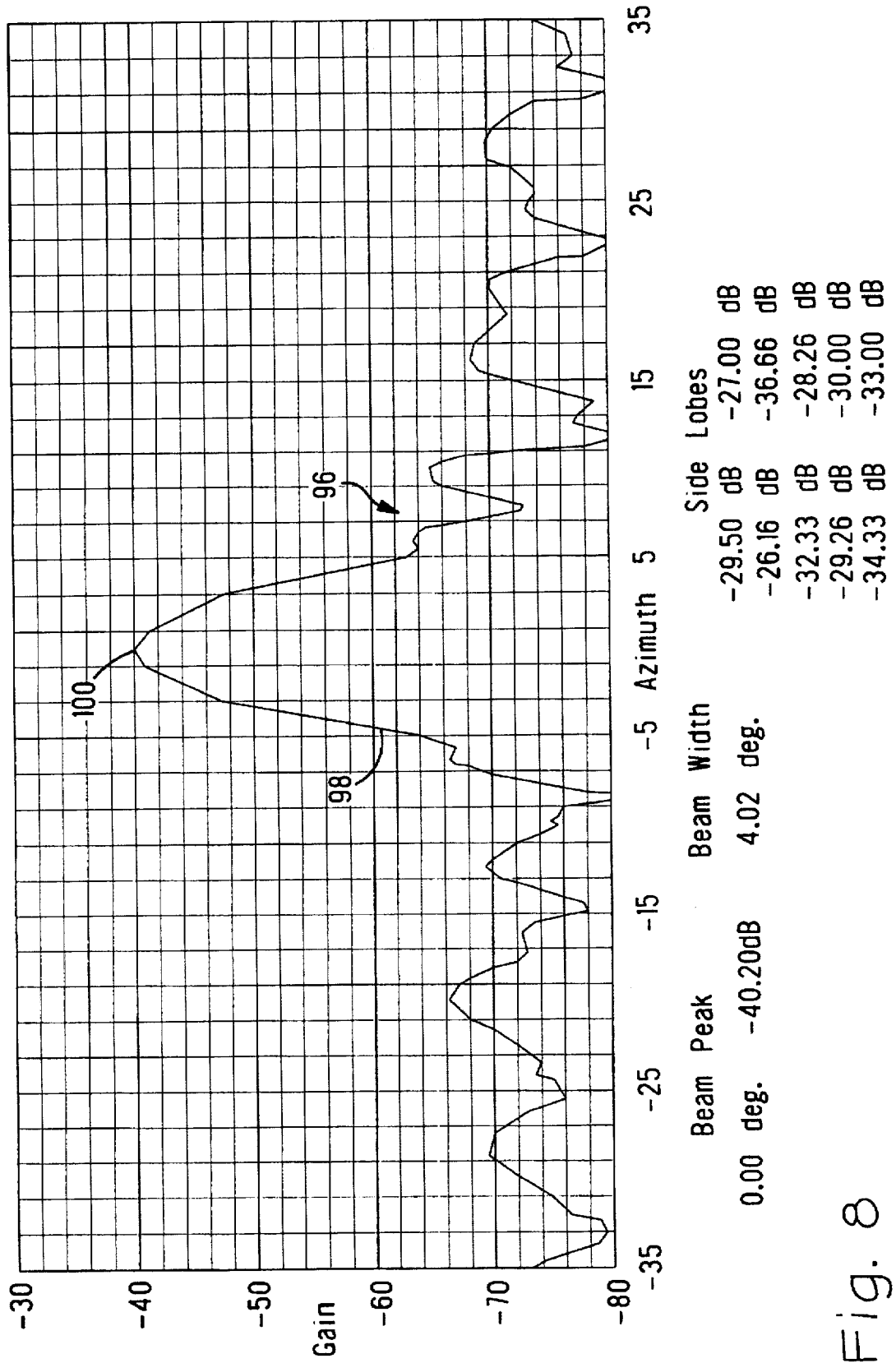
FIG. 8 is a plot of the pattern obtained with an antenna as shown in FIG. 2 and taken in the azimuthal plane.

In a vehicle application the output signal on line 22 carries a doppler signal which typically is of the order of hundreds of Herz. The effectiveness of the microstrip antenna 18 can be particularly appreciated from the antenna pattern plot 96 of actual data and shown in FIG. 8. The main beam 98 has a linear polarization and has a 3 db beam width of about four degrees and side lobes are at least 27 db down from the peak 100. Some degradation of this performance can be expected in the manufacture of antennas, but side lobes can still be kept to very low levels.

Having thus described a microstrip antenna is accordance with the invention, its advantages can be appreciated. Variations of the embodiment can be made without departing from the invention. For example, the antenna feed structure can be made with a different number of feed points such as four. In such case, the power divider 20 splits power three times in a tree-like structure that produces four feed points 38. The array of patch elements is then formed into four segments with main lines and branch lines as described herein. The feed points are appropriately located to establish the desired power distribution.

What is claimed is:

1. An antenna comprising:
  a dielectric substrate on a metal plate, a microstrip structure on the substrate connected to an antenna feed point, the microstrip structure comprising: at least one corresponding main line, branch lines extending transverse to each corresponding main line, patch elements connected to respective branch lines, coupling strips extending between respective branch lines and a corresponding main line, an enlarged impedance transformer within each corresponding main line being connected to one of the coupling strips at a junction of said one of the coupling strips and a corresponding main line, said enlarged impedance transformer not being spaced upstream from said junction, and the coupling strips being of different sizes to distribute different amounts of rf power with respective branch lines.

2. An antenna as recited in claim 1 wherein, the coupling strips of different sizes comprise coupling strips of different widths.

3. An antenna as recited in claim 1 wherein, the impedance transformers are connected to respective junctions.

4. An antenna as recited in claim 1, and further comprising: connecting strips extending between respective patches and respective branch lines, and additional impedance transformers within the branch lines, the additional impedance transformers being connected to respective connecting strips.

* * * * *